United States Patent [19]
Hosokawa et al.

[11] Patent Number: 6,130,269
[45] Date of Patent: Oct. 10, 2000

[54] PRESSURE-SENSITIVE ADHESIVE OF (METH)ACRYLATE, UNSATURATED ACID, POLY(METH)ACRYLATE AND EPOXY RESIN

[75] Inventors: Kazuhito Hosokawa; Shigeki Muta; Hitoshi Takahira; Takao Yoshikawa, all of Osaka, Japan

[73] Assignee: Nitto Denko Corporation, Osaka, Japan

[21] Appl. No.: 09/194,340

[22] PCT Filed: May 28, 1997

[86] PCT No.: PCT/JP97/01811

§ 371 Date: Nov. 24, 1998

§ 102(e) Date: Nov. 24, 1998

[87] PCT Pub. No.: WO97/45500

PCT Pub. Date: Dec. 4, 1997

[30] Foreign Application Priority Data

May 30, 1996 [JP] Japan .................................... 8-136247

[51] Int. Cl.[7] .............................. C08F 2/48; C08G 59/17; C08J 3/28

[52] U.S. Cl. ............................. 522/100; 522/36; 522/39; 522/42; 522/43; 522/44; 522/59; 525/481; 525/531

[58] Field of Search ..................................... 525/531, 481; 522/36, 39, 42, 43, 44, 59, 100

[56] References Cited

U.S. PATENT DOCUMENTS 4,717,605  1/1988  Urban et al. ............................ 522/100
5,086,088  2/1992  Kitano et al. ........................... 522/100
5,502,085  3/1996  Ohura et al. ........................... 522/106

FOREIGN PATENT DOCUMENTS

| 1-24876 | 1/1989 | Japan . |
| 3-37284 | 2/1991 | Japan . |
| 3-109472 | 5/1991 | Japan . |
| 5-271624 | 10/1993 | Japan . |
| 640556 | 6/1980 | U.S.S.R. . |
| 892405 | 12/1981 | U.S.S.R. . |
| WO 96/21704 | 7/1996 | WIPO . |

*Primary Examiner*—Robert E. L. Sellers
*Attorney, Agent, or Firm*—Sughrue, Mion, Zinn, Macpeak & Seas, PLLC

[57] ABSTRACT

A thermosetting pressure-sensitive adhesive comprising a photopolymerization product of a composition containing a) 100 parts by weight of a (meth) acrylic acid alkyl ester wherein the average carbon atom number of the alkyl group is from 2 to 14 and from 30 to 1% by weight of a monoethylenically unsaturated acid copolymerizable with the ester, b) from 0.02 to 5 parts by weight of a polyfunctional (meth)acrylate as a crosslinking agent, c) from 0.01 to 4 parts by weight of a photopolymerization initiator, and d) from 5 to 30 parts by weight of an epoxy resin, and not substantially containing a curing agent for the epoxy resin, and an adhesive sheet using the thermosetting type pressure-sensitive adhesive.

8 Claims, No Drawings

PRESSURE-SENSITIVE ADHESIVE OF (METH)ACRYLATE, UNSATURATED ACID, POLY(METH)ACRYLATE AND EPOXY RESIN

TECHNICAL FIELD

The present invention relates to a thermosetting type pressure-sensitive adhesive excellent in the heat resistance, which can endure the use at a high temperature of at least 100° C. and the use at a soldering step and also to an adhesive sheet prepared by forming the pressure-sensitive adhesive on a base material and making it to a sheet form, a tape form, etc.

BACKGROUND ART

To simplify the work and to improve the safety and hygiene, a treatment system by adhesive sheets is widely used in place of a system of coating and drying a liquid adhesive. As the adhesives for the adhesive sheets, thermosetting type adhesives capable of setting by heat treatment are proposed in the use of adhering electron parts, etc. The thermosetting type adhesive is excellent in the adhesive strength and the heat resistance, but does not have a tackiness at normal temperature to make a temporary adhesion difficult, and contains a large amount of low-molecular weight components before setting, which results in giving a problem of causing adhesive oozing, etc. Also, there is a difficulty that a thermosetting type adhesive, which is excellent in the storage stability, needs a long time for setting. On the other hand, a thermosetting type adhesive, which can set in a short time, is poor in the storage stability.

On the other hand, tacky sheets have a tackiness at normal temperature, can adhere to an adherend without need of any pre-treatment, and can immediately show the adhesive strength. However, tacky sheets have a disadvantage that they are generally inferior in the adhesive strength and the heat resistance as compared with adhesives. Also, JP-A-5-117593 (the term "JP-A" as used herein means an "unexamined published Japanese patent application") discloses that an adhesive strength and a high heat resistance are realized by the use of a photopolymerizable composition containing an acrylic acid alkyl ester as the main component, but these effects are still at the level of the conventional tacky sheets. Thus, it has been desired to develop an adhesive sheet which exhibits not only the adhesion as the tacky sheet at the beginning of sticking to an adherend but also the same high adhesion and high heat resistance as those of an adhesive after sticking.

As a material respond to the desire, a so-called tacky adhesive having both the properties of the tacky agent and the adhesive is proposed. For example, JP-A-2-272076 discloses a thermosetting type pressure-sensitive adhesive prepared using a photopolymerizable composition, as the raw material, obtained by adding an epoxy resin to an acrylic acid ester monomer. Also, JP-A-7-2978 discloses a thermosetting type pressure-sensitive adhesive prepared using a photopolymerizable composition, as the raw material, obtained by adding the ester of an epoxy group-containing alcohol and (meth) acrylic acid and an epoxy resin to a (meth)acrylic acid alkyl ester.

In these proposals, the thermosetting type pressure-sensitive adhesives having both properties of a tacky agent and an adhesive are obtained by photopolymerizing the photo-polymerizable composition by the irradiation of ultraviolet rays. The above-described composition contains a curing agent such as imidazole, dicyandiamide, polyamine, etc. to cause a curing reaction of the curing agent and an epoxy group. In this case, there is a fear that the above-described curing reaction proceeds gradually during storage before or after the photopolymerization to thereby lower the adhesion, etc.

As described above, the thermosetting type pressure-sensitive adhesives proposed as described above have a trouble in the point of the storage stability and in particular, the thermosetting type pressure-sensitive adhesive disclosed JP-A-2-272076 is insufficient in the heat resistance because the acrylic polymer formed by the photopolymerization and the epoxy resin is not crosslinked after setting.

The present invention has been made under these circumstances and an object of the present invention is to provide a thermosetting type pressure-sensitive adhesive which has a tackiness at normal temperature, can easily temporarily adhere to an adherend, can set in a short time by heating to show a high adhesive strength and a high heat resistance, and, is excellent in the storage stability, and an adhesive sheet of a sheet form or a tape form prepared using the above-described thermosetting type pressure-sensitive adhesive.

DISCLOSURE OF THE INVENTION

As the result of various investigations for achieving the above-described objects, the present inventors have discovered that by adding a monomer having a carboxyl group, etc., in the molecule to an acrylic monomer constituting a photopolymerizable composition, photopolymerizing the monomers, and then effecting reaction of the composition photopolymerized and an epoxy resin, the acrylic polymer and the epoxy resin form crosslink bondings to give a high adhesion and a high heat resistance, the pressure-sensitive adhesive after the photopolymerization but before the above-described reaction can temporarily adhere to an adherend at normal temperature and can set in a short time by the reaction, and the resulting pressure-sensitive adhesive is excellent in the storage stability because the adhesive does not contain a general curing agent such as imidazole, dicyandiamide and polyamine. Based on the above, the present inventors have accomplished the present invention.

That is, an aspect of the present invention is a thermosetting type pressure-sensitive adhesive comprising a photopolymerization product of a composition containing following components a) to d):

a) 100 parts by weight-of a monomer mixture made up of from 70 to 99% by weight of a (meth) acrylic acid alkyl ester wherein the carbon atom number of the alkyl group is from 2 to 14 on an average and from 30 to 1% by weight of a monoethylenically unsaturated acid copolymerizable with the (meth)acrylic acid alkyl ester;

b) from 0.02 to 5 parts by weight of a polyfunctional (meth)acrylate as a crosslinking agent;

c) from 0.01 to 4 parts by weight of a photopolymerization initiator; and d) from 5 to 30 parts by weight of an epoxy resin, and not substantially containing a curing agent for the epoxy resin of the component d).

Another aspect of the present invention is an adhesive sheet of a sheet form, a tape form, etc., comprising a base material having form on one surface or both surfaces thereof a layer of the above-described thermosetting type pressure-sensitive adhesive.

BEST MODES FOR CARRYING OUT THE INVENTION

The monomer mixture of the component a) is made up of a (meth)acrylic acid alkyl ester and a monoethylenically unsaturated acid copolymerizable with the (meth)acrylic acid alkyl ester. Usually, 30% by weight or less of the former (meth) acrylic acid alkyl ester may be replaced with various vinyl series monomers known as monomers for modifying general acrylic pressure-sensitive adhesives, such as vinyl acetate, styrene, acrylonitrile, etc.

The (meth) acrylic acid alkyl ester includes, for example, ethyl (meth)acrylate, n-butyl (meth)acrylate, 2-ethylhexyl (meth)acrylate, isooctyl (meth)acrylate, and isononyl (meth) acrylate. In these monomers, one or more kinds of the (meth) acrylic acid alkyl esters wherein the average carbon atom number of the alkyl group(s) becomes from 2 to 14 are used.

The monoethylenically unsaturated acid copolymerizable with the (meth) acrylic acid alkyl ester(s) includes, for example, (meth)acrylic acid, itaconic acid, and 2-acrylamide propanesulfonic acid.

In the monomer mixture of the component a), as the use proportion of the (meth)acrylic acid alkyl ester and the monoethylenically unsaturated acid copolymerizable with the ester, it is better that the former is from 70 to 99% by weight, and preferably from 80 to 95% by weight and the latter is from 30 to 1% by weight, and preferably from 20 to 5% by weight.

When the (meth) acrylic acid alkyl ester is used together with the vinyl series monomer as described above, the use proportion of the (meth)acrylic acid alkyl ester and the vinyl series monomer is from 70 to 99% by weight, and preferably from 80 to 95% by weight, with the proviso that the use proportion of the vinyl series monomer is 30% by weight or less of the total amount of the (meth) acrylic acid alkyl ester and the vinyl series monomer, and the use proportion of the monoethylenically unsaturated acid is from 1 to 30% by weight, and preferably from 5 to 20% by weight.

If the use proportions of them are outside the above-described ranges, good effects are hard to obtain in the adhesive characteristics after the photopolymerization and the epoxy curing reaction.

The crosslinking agent of the component b) in the present invention is a polyfunctional (meth)acrylate and, for example, bifunctional or higher functional polyvalent alkyl (meth)acrylate monomers such as trimethylolpropane tri (meth)acrylate, pentaerythritol tetra(meth)acrylate, 1,2-ethylene glycol di(meth)acrylate, 1, 6-hexanediol di (meth) acrylate, and 1, 12-dodecanediol di (meth) acrylate can be used.

The amount of the polyfunctional (meth) acrylate differs a little according to the number of the functional groups but is from 0.02 to 5 parts by weight, and preferably from 0.2 to 3 parts by weight per 100 parts by weight of the monomer mixture of the component a).

The use of the polyfunctional (meth)acrylate in such a proportion exhibits the crosslinking effect for the acrylic polymer, whereby a good cohesive force is retained to exhibit a high heat resistance.

The photopolymerization initiator of the component c) in the present invention includes benzoin ethers such as benzoin methyl ether, benzoin isopropyl ether, etc.; substituted benzoin ethers such as anisoin methyl ether, etc.; substituted acetophenones such as 2,2-diethoxyacetophenone, 2,2-dimethoxy-2-phenoneacetophenone, etc.; substituted α-ketols such as 2-methyl-2-hydroxypropiophenone, etc.; aromatic sulfonyl chlorides such as 2-naphthalenesulfonyl chloride, etc.; and photoactive oximes such as 1-phenone-1, 1-propanedion-2-(o-ethoxycarbonyl)oxime, etc.

The amount of the photopolymerization initiator is from 0.01 to 4 parts by weight, and preferably from 0.05 to 1 part by weight per 100 parts by weight of the monomer mixture of the component a). If the amount of the photopolymerization initiator is less than 0.01 part by weight, the photopolymerization initiator is consumed by a light energy in an early stage, whereby the conversion is lowered, while if the amount thereof is more than 4 parts by weight, the conversion is increased, but there is a tendency that the molecular weight of the polymer formed is lowered to lower the cohesive force of the pressure-sensitive adhesive.

The epoxy resin of the component d) in the present invention is a compound containing at least two epoxy groups in the molecule and is properly selected from the group consisting of bisphenol epoxy resins, phenol novolak epoxy resins, halogenated bisphenol epoxy resins, etc. Each of these epoxy resins does not have a photopolymerizing group in the molecule.

The amount of the epoxy resin is from 5 to 30 parts by weight, and preferably from 5 to 20 parts by weight per 100 parts by weight of the monomer mixture of the component a). If the amount of the epoxy resin is less than 5 parts by weight, the crosslinking reaction of the acrylic polymer and the epoxy resin does not sufficiently proceed and the heat resistance becomes insufficient. Also, if the amount thereof is more than 30 parts by weight, the set material is subjected to excessive crosslinking, whereby a peeling phenomenon of the pressure-sensitive adhesive or the adhesive sheet occurs at the surface of the adherend and also the storage stability thereof is lowered.

The photopolymerizable composition of the present invention contains the monomer mixture of the component a), the polyfunctional (meth)acrylate of the component b), the photopolymerization initiator of the component c), and the epoxy resin of the component d) as the indispensable components and for the sake of handling, the monomer mixture of the component a) can be pre-polymerized to some extent using the photopolymerization initiator of the component c) (by a general pre-polymerization, the monomer mixture becomes, for example, a coatable syrup-form product having a viscosity of from about 500 to 5,000 c.p.). In the case of carrying out the pre-polymerization, when the epoxy resin of the component d) is added, it sometimes happens to cause a gelation and hence it is preferred that the epoxy resin of the component d) is added after the pre-polymerization.

The photopolyerizable composition in the present invention may further contain, in addition to the above-described four components a) to d), conventionally known various additives such as a tackifier, a polar monomer, a plasticizer, a softening agent, a filler, a pigment, a dye, an antioxidant, etc., as optional components in the range of not disturbing the photopolymerization by the irradiation of ultraviolet rays.

In addition, to the photopolymerizable composition in the present invention, a general curing agent such as imidazole, dicyandiamide, polyamine, etc., which is known as a curing agent for an epoxy resin, cannot be added. However, even when a curing agent exists in the photopolymerizable composition, if the curing reaction with the epoxy resin does not substantially proceed and there is no possibility of largely reducing the storage stability, which is one of the objects of the present invention, such a curing agent may exist in the photopolymerizable composition. The term "not substantially containing" in the present invention means the above-described matter.

In the present invention, after coating the photopolymerizable composition onto an adherend or on one surface or both surfaces of a base material, a tackified acrylic pressure-sensitive adhesive having a pressure-sensitive adhesion by itself is formed by photopolyemerizing the components a) each other or the component a) and the component b) by the irradiation of ultraviolet rays of from about 400 to 1,500 mj/cm$^2$.

In this case, in addition to non-releasing base materials such as synthetic resin films (e.g., polyester films) and fiber base materials, releasing base materials such as releasing papers can be used as the base material. In the use of the releasing base material, the layer of the pressure-sensitive adhesive formed on the releasing base material may be transferred onto the non-releasing base material. Thus, the adhesive sheets of the present invention include the adhesive sheet having such a non-releasing base material and the adhesive sheet having the releasing base material.

The acrylic pressure-sensitive adhesive made up of the photopolymerization product thus formed has excellent properties desired for a thermosetting type pressure-sensitive adhesive, that is, the pressure-sensitive adhesive has a tackiness at normal temperature and can easily temporarily adhere to an adherend. Heat treatment causes the reaction of acrylic polymer and the epoxy resin to effect the setting in a short time, thereby providing a pressure-sensitive adhesive having a high adhesive strength and a high heat resistance, in particular, endurance under the use at a high temperature of at least 100° C. and the use at a soldering step. The heat treatment is usually carried out at a temperature of from 100 to 200° C. for 10 hours to 0.5 hour, and preferably at a temperature of from 130 to 170° C. for 5 hours to 1 hour. Furthermore, in the state of the thermosetting pressure-sensitive adhesive before applying the heat treatment, the above-described reaction scarcely proceeds and the thermosetting pressure-sensitive adhesive has an excellent storage stability.

EXAMPLES

The present invention is described more practically by the following examples, wherein all parts, unless otherwise indicated, are by weight.

EXAMPLE 1

In a four-neck flask were placed 90 parts of isononyl acrylate, 10 parts of acrylic acid, and 0.05 part of 2,2-dimethoxy-2-phenylacetophenone and by irradiating the mixture with ultraviolet rays under a nitrogen gas atmosphere to partially photopolymerize the monomer mixture, a syrup having a viscosity of about 30 poises was obtained.

By uniformly mixing 100 parts of the partially polymerized syrup with 0.2 part of trimethylolpropane triacrylate as a crosslinking agent and 15 parts of an epoxy resin (Epikote 828, trade name, made by Yuka Shell Epoxy Kabushiki Kaisha), a photopolymerizable composition was prepared.

After coating the photopolymerizable composition on a base material made up of a polyethylene terephthalate having a thickness of 25 μm subjected to a low-adhesive releasing treatment, the coated layer was photopolymerized by irradiating ultraviolet rays of 900 mj/cm$^2$. Thereafter; by slitting the base material having formed thereon the layer of the photopolyerized composition in 20 mm width, an adhesive tape having the layer of a thermosetting type pressure-sensitive adhesive of 50 μm in thickness was prepared.

EXAMPLE 2

In a four-neck flask were placed 50 parts of isooctyl acrylate, 35 parts of butyl acrylate, 15 parts of acrylic acid, and 0.05 part of 2,2-dimethoxy-2-phenylacectophenone and by irradiating the mixture with ultraviolet rays under a nitrogen gas atmosphere to partially photopolymerize the monomer mixture, a syrup having a viscosity of about 30 poises was obtained. By uniformly mixing 100 parts of the partially polymerized syrup with 0.3 parts of 1,6-hexanediol diacrylate as a crosslinking agent and 10 parts of an epoxy resin (Epikote 815, trade name, made by Yuka Shell Epoxy Kabushiki Kaisha), a photopolymerizable composition was prepared. Using the photopolymerizable composition thus prepared, an adhesive tape was prepared in the same manner as in Example 1.

COMPARATIVE EXAMPLE 1

A photopolymerizable composition was prepared in the same manner as in Example 1 except that the epoxy resin was not used. Using the photopolymerizable composition, an adhesive tape was prepared in the same manner as in Example 1.

COMPARATIVE EXAMPLE 2

A photopolymerizable composition was prepared in the same manner as in Example 1 except that 10 parts of N-vinylpyrrolidone was used in place of 10 parts of acrylic acid and also 3 parts of "Novacure HX-3721" (trade name, made by Asahi Chemical Industry Co., Ltd.) was added as a curing agent for the epoxy resin. Using the photopolymerizable composition, an adhesive tape was prepared in the same manner as in Example 1.

Each of the adhesive tapes prepared in Examples 1 and 2 and Comparative Examples 1 and 2 had a tackiness at normal temperature and could easily temporarily adhere to an adherend.

With respect to each of the adhesive tapes, the solvent-insoluble components of the pressure-sensitive adhesive after setting by the heat treatment, the 900 releasing adhesive strength, and the soldering heat resistance were evaluated by the following methods. The results obtained are shown in Table 1 below. In addition, the value in the brackets in the table shows the solvent insoluble components of the pressure-sensitive adhesive before setting by the heat treatment for reference.

Solvent-Insoluble Components

From each adhesive tape in the state before setting or after setting by heat-treating at 150° C. for 1 hour, about 2.0 g of the pressure-sensitive adhesive was sampled and weighed accurately. The sample was filled in an accurately weighed cylindrical filter paper and subjected to an extraction treatment (extraction solvent: ethyl acetate, extraction condition: 24 hours at a temperature of from 80 to 90° C.) by a Soxhlet extractor. After the extraction treatment, the cylindrical filter paper was took out from the extractor and the dry weight of the residue was measured. The ratio of the dry weight of the residue to the weight of the sample was defined as-the solvent-insoluble components (weight%).

90° Releasing Adhesive Strength

Each adhesive tape having a width of 10 mm and a length of 50 mm was adhered to a polyimide film having a thickness of 25 μm and the film was adhered to a glass-epoxy plate having a thickness of 1 mm. The sample was press-adhered under the pressing condition of 150° C., 5 kg/cm$^2$, and 5 minutes and after setting the pressure-sensitive adhesive by the heat treatment of 150° C. for 1 hour, the assembly was allowed to stand for 30 minutes in the atmospheric condition of a temperature of 23° C. and a relative humidity of 65% RH. Thereafter, a tension test was carried out by pulling the polyimide film from the surface of the glass-epoxy plate in the 90° direction at a tensile speed of 50 mm/minute in an atmospheric condition of 23° C. From the chart (strength v.s. time) obtained, the central value of the fluctuation of the strength is employed as the 90° releasing adhesive strength.

Soldering Heat Resistance A glass-epoxy plate having a thickness of 1 mm was adhered to a copper-adhered laminated plate [CCL] (rolled copper foil/adhesive/Kapton films: 35 μm/15 μm/25 μm) with each adhesive tape such that no bubbles entered between both plates. A sample obtained by cutting into 30 mm square was press-adhered under the pressing condition of 150° C., 5 kg/cm², and 5 minutes, and after setting the pressure-sensitive adhesive by heat-treating at 150° C. for 1 hour, the assembly was treated for 30 seconds in the state of being floated on a soft solder bath molted at 260° C. with the glass-epoxy plate above. The adhered state of the sheets was visually observed and the presences of bubbles of the pressure-sensitive adhesive and adhesion abnormalities (floating, -creases, peeling and slipping) were evaluated. The case of observing neither changes nor abnormalities was evaluated as "A" and the case of observing changes and/or normalities was observed as "B".

TABLE 1

|  | Solvent-Insoluble Components (wt. %) | 90° Releasing Adhesive Strength (g/cm²) | Soldering Heat-Resisting Property |
| --- | --- | --- | --- |
| Example 1 | 99 [71] | 1,100 | A |
| Example 2 | 99 [70] | 1,300 | A |
| Comparative Example 1 | 83 | 600 | B |
| Comparativ Example 2 | 95 [67] | 1,100 | B |

From the results shown in Table 1, it can be seen that the adhesive tapes of the present invention prepared in Examples 1 and 2 have large solvent-insoluble components after setting by the heat treatment, have the high 900 releasing adhesive strength, and have the good soldering heat resistance. On the other hand, because the adhesive tape of Comparative Example 1 is not of a thermosetting type, the adhesive tape has a small solvent-Insoluble components and is inferior in the 90° releasing adhesive strength and the soldering heat resistance. Also, the adhesive tape of Comparative Example 2 shows a good result in the 90° releasing adhesion as a thermosetting type pressure-sensitive adhesive but cannot satisfy the soldering heat resistance.

Furthermore, after storing each of the adhesive tapes of Examples 1 and 2 and Comparative Example 2 for 90 days under the atmospheric condition of a temperature of 23° C. and a relative humidity of 65% RH, the 90° releasing adhesive strength and the soldering heat resistance were evaluated by the same methods as described above.

As the results there of, in the adhesive tapes of Examples 1 and 2, both the properties were almost the same as those before the storage. On the other hand, in the adhesive tape of Comparative Example 2, not only the soldering heat resistance but also the 90° releasing adhesive strength were largely lowered and the adhesive tape could not be used for practical purpose.

INDUSTRIAL APPLICABILITY

As described above, because the present invention has the constitution of preparing a specific photopolymerizable composition containing an epoxy resin and a monoethylenically unsaturated acid and reacting both components after carrying out the photopolymerization, a thermosetting type pressure-sensitive adhesive and an adhesive sheet of a sheet form, a tape form, etc., having the layer of the thermosetting pressure-sensitive adhesive, which have a tackiness at normal temperature, can easily temporarily adhere to an adherend, can set in a short time by heating to show a high adhesive strength and a high heat resistance, in particular, can endure the use at a high temperature of at least 100° C. and the use in a soldering step, has an excellent heat resistance, and also is excellent in the storage stability, can be provided.

What is claimed is:

1. An adhesive sheet comprising a base material having formed on one surface or both surfaces thereof a layer of a thermosetting type pressure-sensitive adhesive comprising a photopolymerization product of a composition containing following components a) to d):
   a) 100 parts by weight of a monomer mixture made up of from 70 to 99% by weight of a (meth)acrylic acidalkyl esterwherein the carbon atom number of the alkyl group is from 2 to 14 on an average and from 30 to 1% by weight of a monoethylenically unsaturated acid copolymerizable with the (meth)acrylic acid alkyl ester;
   b) from 0.02 to 5 parts by weight of a polyfunctional (meth)atrylate as a crosslinking agent;
   c) from 0.01 to 4 parts by weight of a photopolymerization initiator; and
   d) from 5 to 30 parts by weight of an epoxy resin, and not substantially containing a curing agent for the epoxy resin of the component d).

2. A thermosetting type pressure-sensitive adhesive sheet of claim 1, wherein said (meth) acrylic acid alkyl ester is at least one selected from the group consisting of ethyl (meth)acrylate, n-butyl (meth)acrylate, 2-ethylhexyl (meth)acrylate, isooctyl (meth)acrylate, and isononyl (meth)acrylate.

3. A thermosetting type pressure-sensitive adhesive sheet of claim 1, wherein said monoethylenically unsaturated acid is at least one selected from the group consisting of (meth)acrylic acid, itaconic acid, and 2-acrylamide propanesulfonic acid.

4. A thermosetting type pressure-sensitive adhesive sheet of claim 1, wherein said epoxy resin is at least one selected from the group consisting of a bisphenol epoxy resin, a phenol novalak epoxy resin, and a halogenated bisphenol epoxy resin.

5. An adhesive sheet comprising a base material having formed on one surface or both surfaces thereof a layer of a thermosetting type pressure-sensitive adhesive comprising a photopolymerization product of a composition containing following components a) to d):
   a) 100 parts by weight of a monomer mixture made up of from 70 to 99% by weight of a (meth)acrylic acid alkyl ester, wherein the carbon atom number-of the alkyl group is from 2 to 14 on an average, and a vinyl series monomer, with the proviso that the amount of the vinyl series monomer is 30% by weight or lower to the total amount of the (meth)acrylic acid alkyl ester and the vinyl series monomer, and from 1 to 30% by weight of a monoethylenically unsaturated acid copolymerizable with the (meth)acrylic acid alkyl ester;
   b) from 0.02 to 5 parts by weight of a polyfunctional (meth)acrylate as a crosslinking agent;

c) from 0.01 to 4 parts by weight of a photopolymerization initiator; and d) from 5 to 30 parts by weight of an epoxy resin, and not substantially containing a curing agent for the epoxy resin of the component d).

6. A thermosetting type pressure-sensitive adhesive sheet of claim 5, wherein said (meth)acrylic acid alkyl ester is at least one selected from the group consisting of ethyl (meth)acrylate, n-butyl (meth)acrylate, 2-ethylhexyl (meth)acrylate, isooctyl (meth)acrylate, and isononyl (meth)acrylate.

7. A thermosetting type pressure-sensitive adhesive sheet of claim 5, wherein said monoethylenically unsaturated acid is at least one selected from the group consisting of (meth)acrylic acid, itaconic acid, and 2-acrylamide propanesulfonic acid.

8. A thermosetting type pressure-sensitive adhesive sheet of claim 5, wherein said epoxy resin is at least one selected from the group consisting of a bisphenol epoxy resin, a phenol novolak epoxy resin, and a halogenated bisphenol epoxy resin.

\* \* \* \* \*